Oct. 29, 1929.  H. A. EDWARDS  1,733,869
PERISCOPE FOR VEHICLES
Filed Nov. 26, 1927
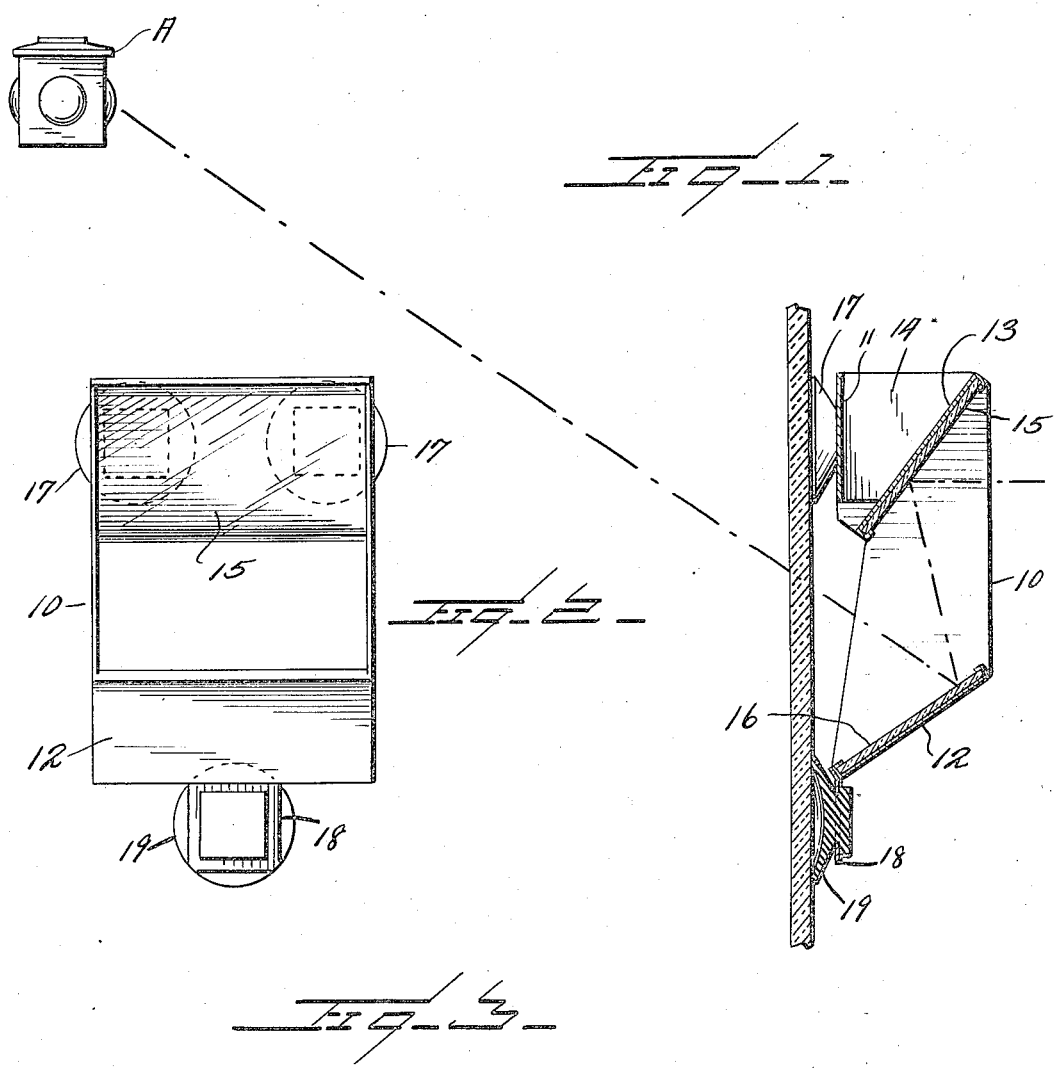
Inventor
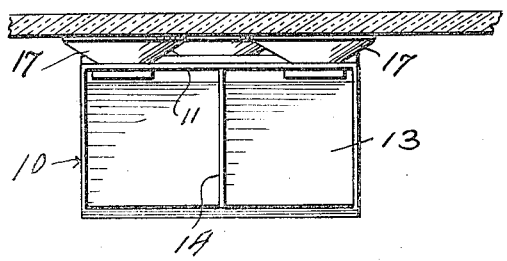
Attorney Patented Oct. 29, 1929

1,733,869

UNITED STATES PATENT OFFICE

HALLEY ANSON EDWARDS, OF AKRON, OHIO

PERISCOPE FOR VEHICLES

Application filed November 26, 1927. Serial No. 235,954.

This invention relates to periscopes designed to be used in connection with automobiles, and the general object of the invention is to provide a periscope which is adapted to be placed upon the windshield of the automobile or supported in conjunction therewith, and which is so constructed that the driver, by looking directly forward into the periscope, may see a signal lamp or traffic signal disposed at a considerable height above the vehicle.

It is quite usual today for traffic control devices in the form of lamps or other signals to be disposed at a height above the road and for the driver to drive so closely beneath this lamp that it is impossible for him, without stooping forward and peering upward beyond the top, to see the signal and thereby note whether the signal has changed or not.

It is, therefore, one of the prime objects of this invention to provide a device of this character which will permit this signal to be seen even though the driver be quite closely adjacent the signal and beneath the same.

A further object is to provide a device of this character which is very simple, which may be cheaply constructed, which will not obscure the ordinary view out through the windshield, and which will be held in place preferably by suction cups or like means.

Other objects will appear in the course of the following description.

My invention is illustrated in the accompanying drawing, wherein:—

Figure 1 is a sectional view through the windshield of an automobile showing my periscope applied thereto and showing the manner in which it permits the sight of a signal light;

Figure 2 is a front elevation of the periscope;

Figure 3 is a top plan view thereof.

Referring to this drawing, it will be seen that my device comprises a case or frame consisting of the two side members 10, the front cross piece 11, and the bottom or rear cross piece 12. There is also a downwardly and forwardly extending cross piece 13 extending from the upper corner of the frame downward and forward toward the middle thereof, and this is preferably braced from the cross piece 11 by means of a brace 14.

Disposed against the cross piece 13 and held in place by overturning the upper and lower edges of the cross piece is a mirror 15 which is disposed at an angle to the vertical and extends upward and rearward. Disposed upon the cross member 12 and held in place by overturning the upper and lower edges of this cross piece is a mirror or reflector 16. This mirror receives the rays of light proceeding from the traffic signal A and reflects the image of the light upward against the mirror 15 and this mirror reflects this image horizontally rearward. It will be understood that the angles of the mirrors 15 and 16 are such that by looking into the mirror 15 which is disposed level with the eyes of the driver, the driver can see the image of an object disposed slightly in advance of the car and relatively high in the air. Thus the driver can note the signal A and note whether this signal has changed or not.

While I do not wish to be limited to any particular means for attaching the periscope to the windshield B, I preferably provide the frame, and particularly the cross piece 11, with the two vacuum cups 17 and extend downward from the front of the frame the yoke-shaped ear 18 to which the vacuum cup 19 is attached. These vacuum cups, when applied to the glass of the windshield, will hold this frame securely against this glass in any desired adjusted position. There will be no more oscillation of the periscope than there will be of the windshield itself. Under some circumstances, the frame 10 with the cross pieces may be made of rubber which may then be cemented to the windshield at the desired position, thus doing away with the necessity of using the vacuum cups.

It will be understood that I do not wish to be limited to the particular angle of the mirror 16 nor of the mirror 15, it being sufficient that the angle shall be such that objects in front of and above the car shall be reflected from the mirror 16 upward against the mirror 15 and then directly outward in a horizontal plane. The mirrors will function properly even if the windshield be slightly canted rearward, as this will merely permit the car to move more directly under the signal and the signal be more easily observed than would otherwise be the case.

I claim:—

1. A periscope of the character described, comprising an open frame consisting of spaced side pieces, an upwardly and rearwardly inclined top cross piece connecting the side pieces and having a groove formed along the upper and lower edges upon the under side thereof, a forwardly and downwardly inclined lower cross piece connecting the side pieces and having a groove formed along the upper and lower edges upon the upper face thereof, a mirror held against the lower face of said upper piece between said grooves, a mirror held upon the upper face of the lower piece between the grooves thereof, and means carried by said frame adjacent the upper and lower pieces for detachably securing the same to a supporting surface.

2. A periscope of the character described, comprising an open frame consisting of spaced side pieces, an upwardly and rearwardly inclined top cross piece connecting the side pieces and having a groove formed along the upper and lower edges upon the under side thereof, a forwardly and downwardly inclined lower cross piece connecting the side pieces and having a groove formed along the upper and lower edges upon the upper face thereof, a mirror held against the lower face of said upper piece between said grooves, a mirror held upon the upper face of the lower piece between the grooves thereof, an attaching element carried by said lower cross piece adjacent the lower edge thereof, a plate extending across the upper portion of said frame back of the top cross piece and mirror carried thereby, and securing means carried by said plate designed to co-operate with the first mentioned securing means for attaching the frame to a supporting surface.

In testimony whereof I hereunto affix my signature.

HALLEY A. EDWARDS.